United States Patent [19]

Fenton

[11] 4,067,603

[45] Jan. 10, 1978

[54] COVER ASSEMBLY FOR OPEN TOP TRUCK BODIES

[76] Inventor: Russell R. Fenton, P.O. Box 151, Bucklin, Kans. 67834

[21] Appl. No.: 690,960

[22] Filed: May 28, 1976

Related U.S. Application Data

[63] Continuation-in-part of Ser. No. 475,950, June 3, 1974, Pat. No. 3,964,781.

[51] Int. Cl.² ............................................. B60P 7/04
[52] U.S. Cl. .................................. 296/100; 296/104; 296/137 B
[58] Field of Search ................ 296/100, 98, 104, 105, 296/101, 137 B, 10; 254/191; 74/224

[56] References Cited

U.S. PATENT DOCUMENTS

| | | | |
|---|---|---|---|
| 2,565,746 | 8/1951 | Turner | 296/104 |
| 2,757,042 | 7/1956 | Schultz | 296/100 |
| 2,807,499 | 9/1957 | Duddleston | 296/100 |
| 2,969,284 | 1/1961 | Ambli | 296/100 |
| 2,970,357 | 2/1961 | Pinson et al. | 254/191 X |
| 3,560,045 | 2/1971 | Finneman | 296/137 B |
| 3,841,697 | 10/1974 | McFarland | 296/100 |

Primary Examiner—Joseph F. Peters, Jr.
Assistant Examiner—Michael J. Forman
Attorney, Agent, or Firm—Gravely, Lieder & Woodruff

[57] ABSTRACT

A cover assembly for covering an open top of a truck body includes a frame which attaches to the truck body and extends over the open top thereof. A cover is attached at its front end to the front of the frame and at its rear end to endless cables extended along the sides of the frame. The cables pass around sheaves which are mounted on the frame at the front and rear thereof. The sheaves at the front of the frame are on a common axle which is powered by a suitable drive in both directions. The cables pass at least one and a half times around the front sheaves so as to form side-by-side convolutions which are prevented from climbing over each other by guide bolts extended between the convolutions. In one direction of movement for the cables, the cover will accumulate in folds and will eventually be located in a compact condition over the front of the frame. In the other direction of movement, the cover will unfold and spread out over the frame. The sides of the cover are attached to the upper passes of the two cables with the connections being such that they will slide along those upper passes as the cables are moved. The upper and lower cable passes may be connected together between the front and rear sheaves so that the lower passes assist in holding the sides of the cover down. The frame may be provided with a removable section to facilitate loading heavy equipment suspended from a hoist boom.

15 Claims, 12 Drawing Figures

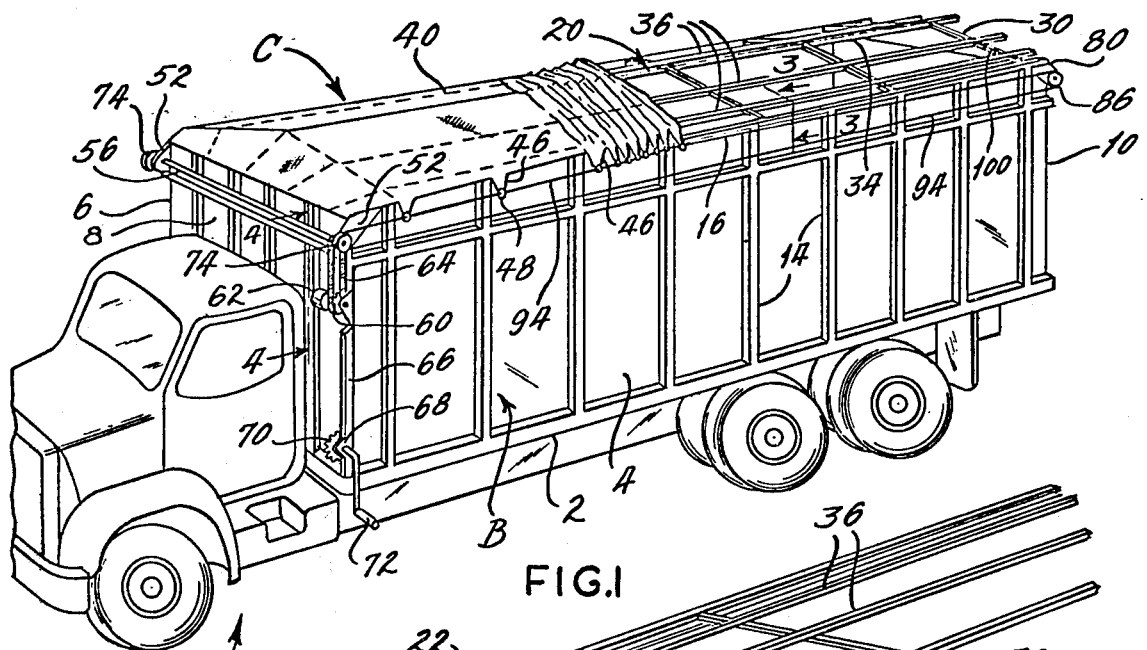
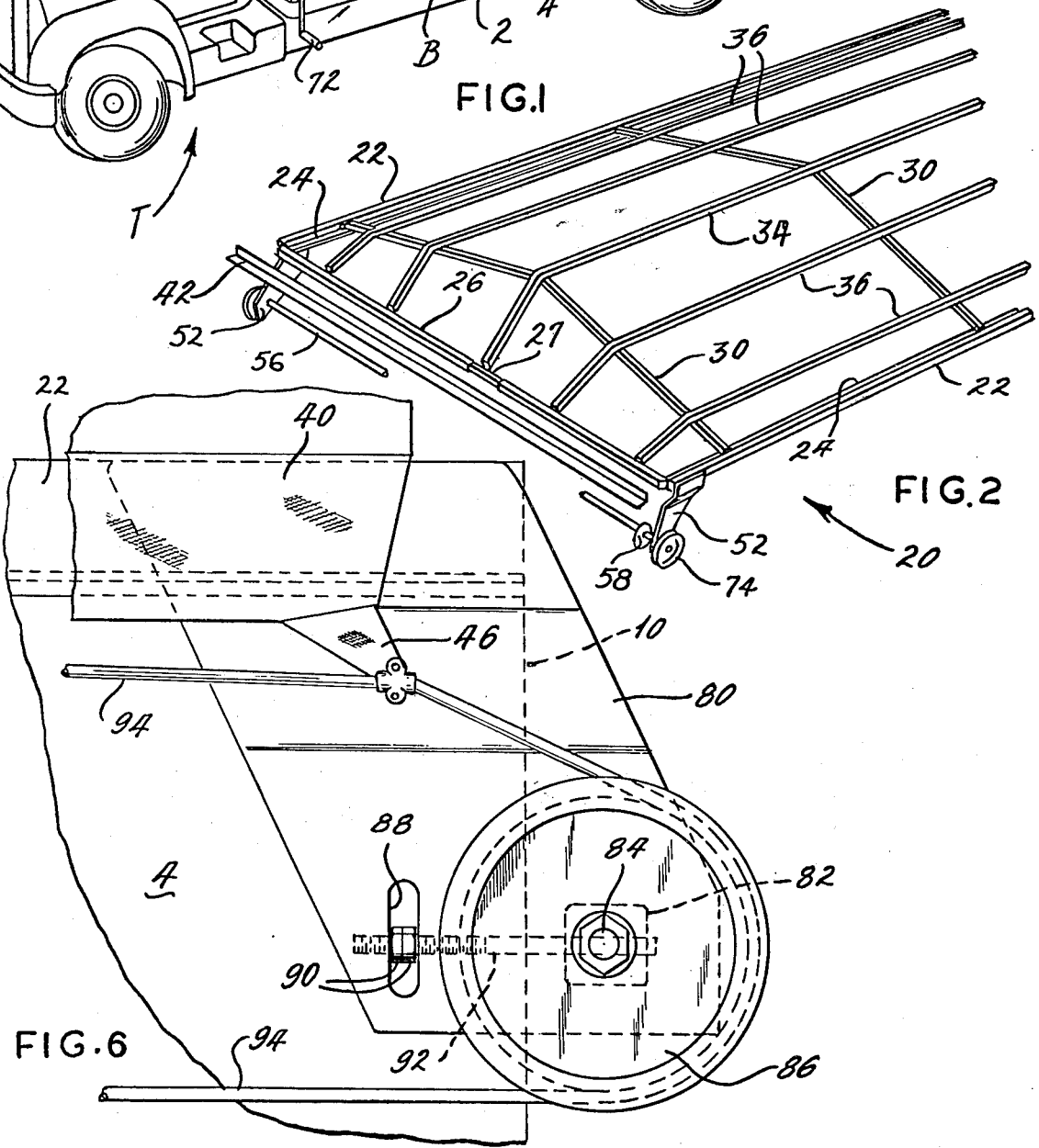

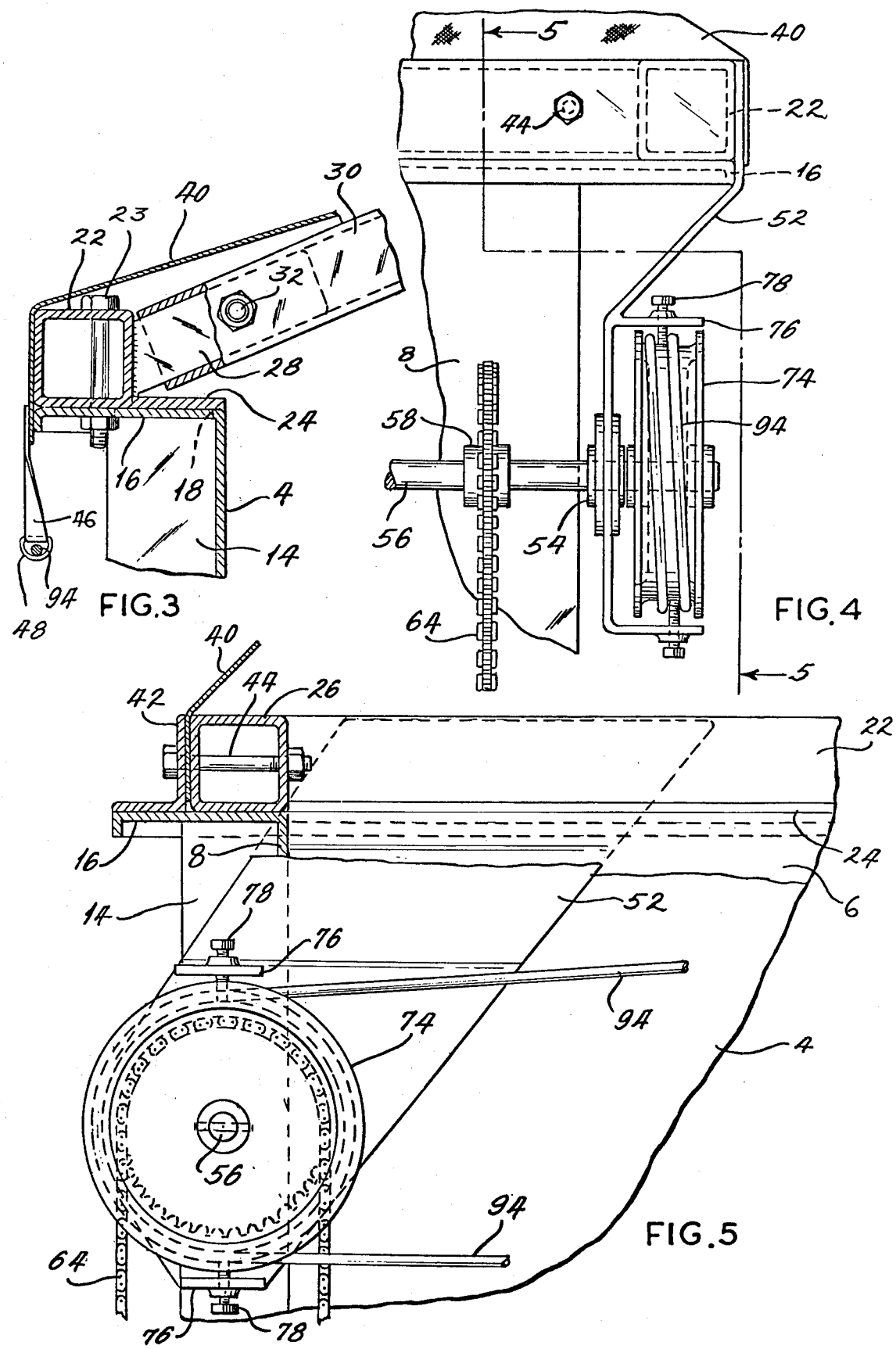

COVER ASSEMBLY FOR OPEN TOP TRUCK BODIES

RELATED APPLICATION

This application is a continuation-in-part of application Ser. No. 475,950, filed June 3, 1974, now U.S. Pat. No. 3,964,781.

BACKGROUND OF THE INVENTION

This invention relates in general to covers and more particularly to a cover assembly for an open top truck body.

Grain is normally transported from the farm to elevators or mills in large trucks, the bodies of which have open tops to facilitate loading. Normally, these trucks traverse the grain fields alongside harvesting machines, such as combines, with the discharge chutes of the harvesting machines directed into the open tops of the truck bodies. While open tops are essential for loading, they are quite detrimental on the highway, since wind passing over the open top of a truck body will blow a substantial amount of the grain out of the truck body. Furthermore, rain can enter the truck body and destroy much of the grain. To avoid these problems, most operators of grain trucks place large tarpulins over the open tops of their truck bodies.

The installation of a tarpaulin on a truck body, which can be as large as 8 feet by 24 feet, is not an easy task and indeed often demands the labor of several individuals. The task is particularly difficult on windy days which are not unusual in the major grain producing areas of North America. While removing a tarpaulin is not as difficult as installing one, it is still a time consuming task which may create problems at grain elevators where the trucks are unloaded.

Finally, even when the truck body is empty a tarpaulin is desirable since it streamlines the truck body and saves fuel while driving at highway speeds. However, tarpaulins are often not used in such instances, merely because they are so difficult to install.

SUMMARY OF THE INVENTION

One of the principal objects of the present invention is to provide a cover assembly for closing the top of an open top truck body. Another object is to provide a cover assembly of the type stated in which the cover is easily and quickly emplaced over the body. A further object is to provide a cover assembly of the type stated in which the cover can easily be emplaced or removed by one person. An additional object is to provide a cover assembly of the type stated which does not interfere with the loading of grains into the truck body and permits the grain to be heaped in the truck body. Still another object is to provide a cover assembly which is sold as a unit and includes a frame which is easily bolted to the truck body. Yet another object is to provide a cover assembly of the type stated which will permit large objects such as machinery to be loaded into the truck body by means of a hoist. These and other objects and advantages will be apparent hereinafter.

The present invention is embodied in a cover assembly for covering an open top truck body and includes a frame which mounts on the body and a cover which is secured to the frame at one end and can be spread over the frame to cover the open top of the truck body. Endless cables are located along the sides of the frame and the opposite end of the cover is connected to these cables. Drive means move the cables which in turn move the cover between folded and unfolded conditions. The invention also consists in the parts and in the arrangements and combinations of parts hereinafter described and claimed.

DESCRIPTION OF THE DRAWINGS

In the accompanying drawings which form part of the Specification and wherein like numerals and letters refer to like parts wherever they occur:

FIG. 1 is a perspective view of a truck provided with a cover assembly constructed in accordance with an embodiment the present invention;

FIG. 2 is a perspective view of the frame forming part of the cover assembly;

FIG. 3 is a sectional view taken along lines 3—3 of FIG. 1 and showing the side rails;

FIG. 4 is an end view taken along lines 4—4 of FIG. 1 and showing the left front corner of the cover assembly;

FIG. 5 is a sectional view taken along lines 5—5 of FIG. 4;

FIG. 6 is a fragmentary elevational view of the extreme rear end of the cover assembly;

DETAILED DESCRIPTION

Figure 7:
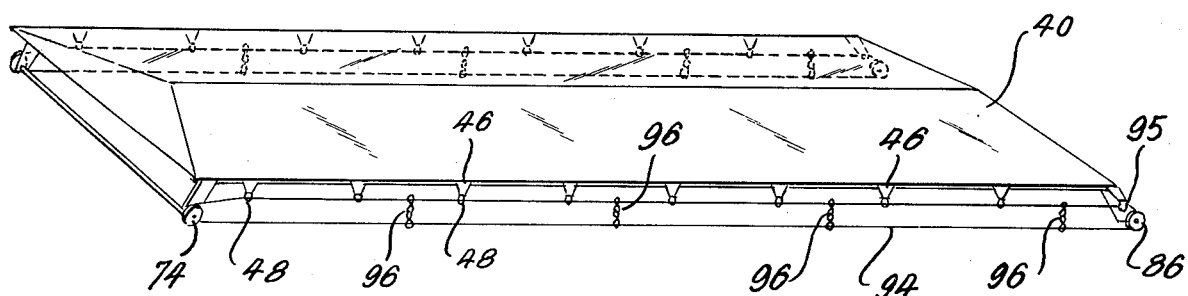
FIG. 7 is a side view of the cover assembly showing connectors for holding the two cable passes together so as to amplify the hold-down force exerted on the sides of the cover.

Referring now to the drawings, a truck T (FIG. 1) has a body B including a bed 2 at the bottom thereof, sidewalls 4 and 6 extended upwardly from the bed 2, and front and rear end walls 8 and 10 connecting the ends of the sidewalls 4 and 6 and likewise extended upwardly from the bed 2. The body B has an open top and supports a cover assembly C for closing the open top if desired. The rear end wall 10 is removable.

The sidewalls 4 and 6 and end walls 8 and 10 are formed from sheet steel reinforced with vertical ribs 14. At the upper ends of the walls 4, 6, 8, and 10, the sheet steel is turned outwardly to form a peripheral flange 16 (FIG. 3) along the top of the body B, and while the width of this flange varies between manufacturers, it is usually on the order of 3 inches. At the upper end of each rib 14, the flange 16 has a rectangular aperture 18 which opens into the hollow interior of the rib 14 to form a stake hole capable of receiving stakes for elevating the walls 4, 6, 8, and 10 of the body B. The truck T has hydraulic cylinders beneath the bed 2 for elevating the front of the body B so as to place the bed 2 at a considerable incline. The rear end wall 10 contains a removable panel so that grain will flow out of the body B when it is inclined.

The cover assembly C includes a frame 20 (FIG. 2) which rests on the peripheral flange 16 of the body B and extends over the open top of the body B to create a grid which is raised at its center about 13 inches above its sides. This grid does not interfere with the loading of grain into the body B. In particular, the frame 20 includes a pair of longitudinal side rails 22 (FIG. 3) which are secured against the upper faces of the flanges 16 on the sidewalls 4 and 6 such that they are flush with the outer edges of the flanges 16. The rails 22 extend the entire length of their respective sidewalls 4 and 6 and are attached to the flanges 16 by bolts 23. The rails 22 are preferably formed from 1¼ inch square steel tubing. Welded to the inside face of each rail 22 is a longitudinal cover plate 24 which likewise extends the length of the sidewalls 4 and 6 and overlies the flanges 16, covering the apertures 18 therein so that grain will not be lost through the stake holes. The front ends of the two side rails 22 abut against a transverse end rail 26 (FIGS. 2 and 3) which overlies the flange 16 on the front wall 8, and this rail is bolted to the flange 16 with its inside face flush with the inside surface of the wall 8. The end rail 26 is also preferably made from 1¼ inch square steel tubing and has its ends cut at an oblique angle. Intermediate its ends the end rail 26 is interrupted so that the rail is actually divided into two sections. One of the sections has a connecting stud 27 welded into it and projected beyond its end into the other section so that the two sections can telescope relative to each other and thereby accommodate truck bodies of different width.

Welded to the inside faces of the two side rails 22 are inclined mounting studs 28 (FIG. 3) which project inwardly and are inclined upwardly at a slight angle. The studs 28 on the two rails 22 align, that is they are located directly opposite from each other across the truck body B. The studs 28 are preferably made from square bar stock small enough to fit into 1¼ inch square tubing.

The mounting studs 28 secure the ends of bows 30 which bridge the open top of the body B. The bows 30 are bent midway between their ends such that their centers are located about 13 inches higher than their ends which are at the side rails 22. The bows 30 are likewise preferably formed from 1¼ inch square steel tubing and are long enough to reach from the mounting stud 28 on one side rail 22 to the corresponding mounting stud 28 on the other side rail 22. Indeed, the mounting studs 28 fit into the hollow ends of the bows 30, and the bows 30 and studs 28 are secured firmly together by bolts 32 which project through them. Since the mounting studs 28 project into the ends of the bows 30, a limited amount of telescoping can occur, and this permits the side rails 22 to move inwardly or outwardly and thereby accommodate truck bodies of different widths. The forwardmost bow 30 is set slightly to the rear of the transverse end rail 26.

Extended over the bends at the midpoints of all the bows 30 is a ridge piece or center stringer 34 (FIG. 2) which at its forward end turns downwardly at a relatively steep angle toward the end rail 26. On each side of the center stringer 34 a pair of lateral stringers 36 are extended over the tops of the bows 30, and these stringers 34 are likewise turned downwardly at their forward ends toward the transverse end rail 26. All the stringers 34 and 36 are parallel with themselves and with the side rails 22 and are secured firmly to the bows 30 by bolts. The spacing between the two outer stringers 36 and the side rails 22 is somewhat less than the spacing between adjacent stringers 34 and 36 themselves. The stringers 34 and 36 are preferably formed from 1¼ inch square steel tubing.

Aside from the frame 20, the cover assembly C also includes flexible cover or tarpaulin 40 (FIG. 1) which is supported on the frame 20. When unfolded, the tarpaulin 40 is wide enough and long enough to completely cover the frame 20 and the open top with the side margins of the tarpaulin 40 being located below the flanges 16 (FIG. 3) of the sidewalls 4 and 6 and the rear margin below the flange 16 on the end wall 26. At its front margin, the tarpaulin 40 is compressed against the front face of the end rail 26 by an angle bar 42 (FIG. 5) held to the end rail 26 by bolts 44. Along its sides the tarpaulin 40 has tabs 46 (FIGS. 1 and 3) stitched to it, and these tabs project beyond the side margins and are provided with metal D-rings 48 at their outer ends. The tabs 46 at the front and rear of the tarpaulin 40 are slightly longer than the tabs 46 in the vicinity of the center of the tarpaulin 40. The tarpaulin when folded occupies only a small portion of the frame 20 generally above the front wall 8 so that grain can be directed into the body B through the large spaces between the bows 30 and stringers 34 and 36 of the frame 20.

At the front ends of the frame 20 bearing plates 52 (FIGS. 4 and 5) are attached firmly to the outside faces of the side rails 22. These plates project downwardly and forwardly with the lower ends being located somewhat in front of the front wall 8. Moreover, the plates 22 turn inwardly below the flange 16 so that the lower portions of them are located quite close to the sidewalls 4 and 6. The plates 52 have bearings 54 bolted to them at their lower ends and a single shaft 56 extends through the bearings 54. The shaft 56 is located slightly in front of the front wall 8 and adjacent to the bearing plate 52 at the sidewall 4 it is fitted with a sprocket 58. The sprocket 58 aligns with a sprocket 60 (FIG. 1) on a motor unit 62 which is bolted to the front wall 8 of the body B and comprises a reversible electric motor, a gear reduction, and a suitable mount. The motor of the unit 62 is electrically connected to the electrical system of the truck T and is operated from within the cab of the truck T. The sprocket 60 of the unit 62 is connected to the sprocket 58 of the shaft 56 through a chain 64. The motor unit 62 is reversible and when energized will rotate the shaft 56.

Bolted to the front wall 8 below the motor unit 62 is an upright bar 66 (FIG. 1) having a bearing 68 at its lower end, and this bearing supports another sprocket 70 which also aligns with the sprocket 58. The axle of the sprocket 70 is capable of receiving the end of a detachable hand crank 72 so that the sprocket 70 can be rotated manually with the crank. The crank 72 and sprocket 70 are strictly for emergency use. If the motor unit 62 fails to operate, it is removed from the front wall 8 and a longer chain 64 is extended around the sprockets 58 and 70. Then, when the crank 72 is turned, the shaft 56 will rotate.

The shaft 56 projects beyond the bearing plates 52 where each end of the shaft 56 is fitted with a sheave 74 (FIGS. 4 and 5). Due to the fact that the lower end of each plate 52 is offset inwardly from its upper end, the sheaves 74 are disposed generally beneath the flanges 16, and as a result do not project laterally any substantial distance beyond the side rails 22 of the frame 20. Each bearing plate 52, moreover, is provided with a pair of outwardly projecting tabs 76, one of which projects directly over the top of the adjacent sheave 74, while the other projects directly below the bottom of the sheave 74. Threaded into the tabs 76 are guide bolts 78 which are oriented generally radially with respect to the sheave 74 and by turning can be advanced toward or retracted from the circumferential groove of the sheave 74. The two guide bolts 78 at each sheave 74 are offset slightly as to each other in the direction of the axis of the shaft 56.

At its rear end, the frame 20 has more bearing plates 80 (FIG. 6) attached to the side rails 22, and these plates are quite similar to the plates 52. The plates 80, while projecting downwardly and having their lower ends offset inwardly from their upper ends, however, project rearwardly also so that their lower ends are at least in part projected beyond the rear wall 10 of the truck body B. The lower end of each rear bearing plate 80 is fitted with a bearing 82 which is bolted in place and each bearing 82 receives an axle 84 on which a rear sheave 86 is mounted. The axle 84 for each bearing plate 80 does not project inwardly much beyond its bearing plate 80 so that the rear of the truck body B is not obstructed by the axles 84. The rear sheaves 86 are positioned outwardly from their respective bearing plates 80, but due to the offset in the plates 80, the sheaves 86 do not extend much if any beyond the side rails 22 of the frame 20. Moreover, the front and rear sheaves 74 and 86 at the sidewall 4 align as do the front and rear sheaves 74 and 86 at the sidewall 6. Each rear bearing plate 80 contains a vertical slot 88 in which aligned jamb nuts 90 are disposed. Threaded through the nuts 90 is an adjusting screw 92 which extends horizontally and has its rear end against the bearing 82 for that plate 80. When the nuts 90 are backed away from each other and then turned in the same direction, the screw 92 will move axially and change the position of the bearing 82, assuming of course that the bolts securing the bearing 82 to plate 80 have been loosened. This changes the spacing between the front and rear sheaves 74 and 86.

Extended between the front and rear sheaves 74 and 86 or each side of the body B are wire ropes or cables 94 (FIG. 1). Each cable 94 is trained one-half turn around its rear sheave 86 and 1½ times around its front sheave 74. Thus along the front portion of each sheave 86 two convolutions of cable 94 exist side-by-side (FIG. 4), whereas along rear portion only one convolution exists. The two passes of the cable 94 pay off of the sheave 86 in a horizontal disposition so that the double convolutions terminate almost directly above and below the shaft 56, that is adjacent to the tabs 76 on the plate 52. It is at these locations that the guide bolts 78 project into the circumferential grooves of the sheave 74 and have their free ends disposed between the two convolutions of the cable 94. The bolts 78 separate the two convolutions and prevent them from crossing. When the two convolutions are separated, the tension in the cable 94 is such that the sheave 74 will slip within it, if the cable 94 becomes stuck or its movement is otherwise impaired. However, if the one convolution were to climb over the other, the tension in the cable 94 would increase significantly and prevent such slippage. Since the two guide bolts 78 prevent the convolutions from crossing, they enable the sheave 74 to, in effect, serve as a clutch which protects the motor unit 62.

The upper pass of the cable 94 extends through the D-rings 48 at the ends of the tabs 46 along the sides of the tarpaulin 40, and the last tab 46, that is the one at the rear end of the tarpaulin 40, is secured to the cable 94 where the two ends of the cable 94 are joined by means of a U-clamp 95 to form the endless configuration (FIG. 7). The clamp 95 is further attached to the D-ring 48 of the last tab 46 on the tarpaulin 40.

OPERATION

The truck body B is loaded with the tarpaulin 40 in its folded condition, in which case the entire tarpaulin 40 is disposed over and supported on the extreme front of the frame 20 and the open top of the truck body B is exposed through the remainder of the frame 20. The discharge chute of a combine or other grain conveying machine is directed toward the top of the body B from above the frame 20 and grain enters the body B through the large spaces between the bows 30 and stringers 34 and 36 of the frame 20. Since the frame 20 is higher over the center of the body B than at the sidewalls 4 and 6, it permits so-called heaping of the grain in the body B. Grain with a high moisture content and particularly corn exhibits a marked tendency to heap, that is accumulate at a greater height directly below the discharge end of the chute.

Once the truck body B is filled with grain, the truck is driven a short distance away from the loading chute and the motor unit 62 is energized such that it rotates the shaft 56 and the front sheaves 74 on that shaft in the direction which causes the upper passes of the two cables 94 to move toward their respective rear sheaves 86. As the upper passes of the two cables 94 move, the rearmost tabs 46 are dragged along with those cable passes and the rear end of the tarpaulin 40 is moved over the stringers 34 and 36. The remainder of the tarpaulin 40 unfolds with the D-rings 48 sliding over the upper passes of the cables 94. After about 30 seconds the rear end of the tarpaulin 40 reaches the rear wall 10 of the body B, and the tarpaulin 40 is completely spread out over the frame 20. Since the tabs 46 are shorter at the center of the tarpaulin 40 than at the ends, the upper passes of the cables 94 bow upwardly and exert downwardly directed forces on the sides of the tarpaulin 40. These forces maintain the tarpaulin 40 tight over the frame 20.

With the tarpaulin 40 spread over the frame 20, the load of grain is completely covered and the truck T may be driven at highway speeds without fear of loosing grain. Likewise, in the event of a rainstorm the grain will not be saturated.

Once the destination for the grain is reached, the operator merely energizes the motor unit 62 in the opposite direction. This causes the upper passes of the cables 94 to move toward the front sheaves 74 and carry the rear end of the tarpaulin 40 with them. As the tarpaulin 40 moves rearwardly it accumulates or gathers in folds with a fold forming generally at each tab 46. Eventually, the frame 20, for all intents and purposes, is completely uncovered and the tarpaulin 40 rests in a compact folded condition at the front end of the frame 20.

Should the tarpaulin 40 encounter excessive resistance, the front sheaves 74 will merely slip within the 1½ turns of the cables 94. This protects the motor of the unit 62. If the motor unit 62 does not operate, the tarpaulin 40 can still be folded and unfolded manually by using the handcrank 72. Indeed, the cover assembly C may be supplied without the motor unit 62, in which case it would be operated by the handcrank 72.

By using the cover assembly C the tarpaulin 40 can be folded and unfolded without climbing up onto the truck body B and without even touching the tarpaulin 40.

MODIFICATIONS

As previously noted, the tabs 46 are shorter at the center or midportion of the tarpaulin 40 than at the ends and this has the effect of distorting the upper passes of the cables 94 upwardly. Hence, the tarpaulin 40 is maintained taut, even midway between its ends where it is most likely to loosen. With the foregoing arrangement, only the upper passes of the cables 94 exert the hold-down force along the sides of the tarpaulin 40.

Even greater retention is provided at the midportion of the tarpaulin 40 by utilizing both the upper and lower passes of the cables 94. More specifically, each cable 94 between its front sheave 74 and its rear sheave 86 is provided with a plurality of connectors 96 (FIGS. 7-9) which hook around the upper and lower passes and prevent those passes from spreading apart. To this end, each connector 96 has an upper hook 98 which loops around the upper pass and a lower hook 100 which hooks around the lower pass. The spacing between the hooks 98 and 100 of each connector 96 is slightly less than the diameter of the sheaves 74 and 86, which are of equal diameter, so that beyond the sheaves 74 and 86 the upper and lower passes are drawn tightly together. The connectors 96 are located between the D-rings 48 and hence are spaced generally evenly along the cables 94. Thus, the connectors 96 along each cable 94 tend to draw the upper pass of the cable 94 downwardly toward the lower pass, and in so doing maintain the tarpaulin 40 extremely taut for its entire length.

When the shaft 56 is rotated to move the tarpaulin 40 to its folded position, the upper passes of the cables 94 slide through the upper hooks 98, while the lower passes slide through the lower hooks 100. Moreover, the connectors 96 are moved along the cables 94 by the D-rings 48 and gather together near the front sheave 74 with those D-rings. Of course, when the cables 94 move in the opposite direction to unfold the tarpaulin 40, the connectors 76 are again moved along the cable 94 by the D-rings 48 and spread out at generally uniform intervals along the entire length of the cable 94.

Figures 8, 9:
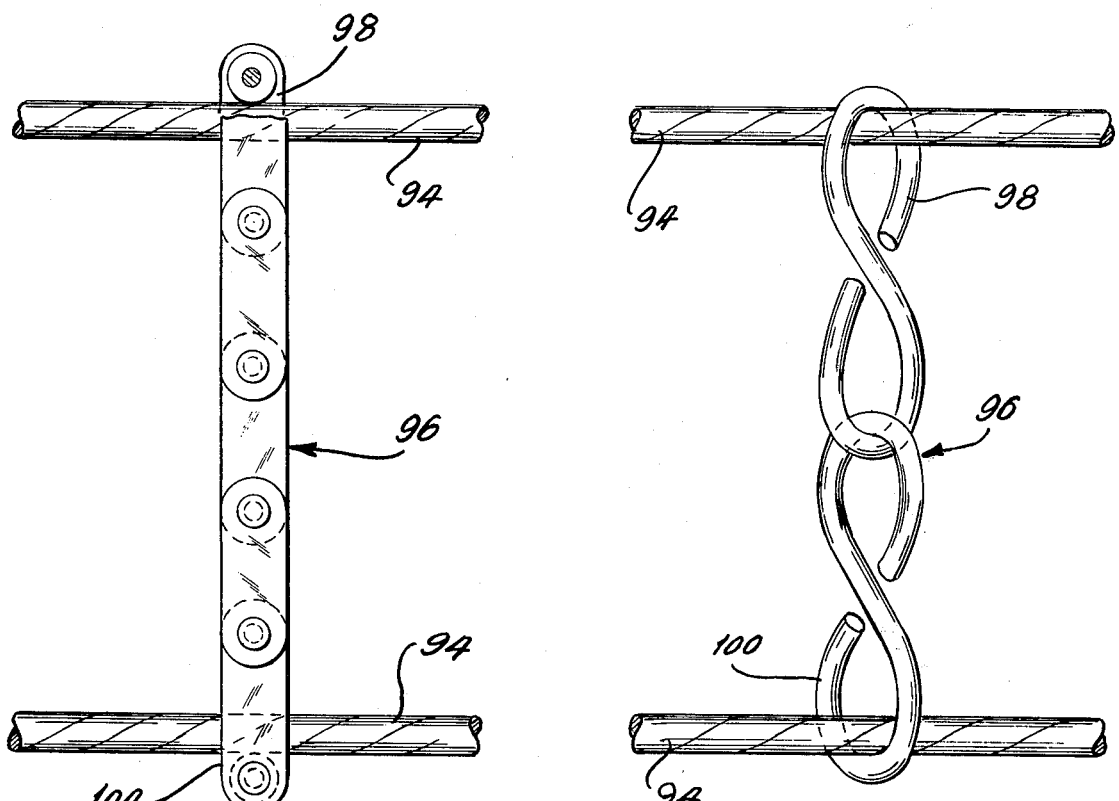
FIG. 8 is an enlarged view of one type of connector composed of two S-hooks.
FIG. 9 is an enlarged view of a connector formed from roller chain links.

Each connector 96 may be two S-hooks connected together (FIG. 8), in which case the upper hook 98 is on the upper S-hook and the lower hook 100 is on the lower S-hook. Each connector 96 may be also several links of roller chain (FIG. 9). In that case the upper hook 98 is the topmost roller, while the lower hook 100 is the lowermost roller.

It is not unusual for the header of a combine to be carried in the body of a grain truck. This capability is possible with the body B when it is covered by the cover assembly C since the cover assembly C is considerably higher than the height of the combine header and therefore does not interfere with the header. Loading the header is greatly facilitated by making a rear portion 102 (FIGS. 10 and 11) of the frame 20 removable so that the boom on the combine may be used to lift the header into the truck body B.

The frame 20 when so modified has its last two bows 30 segmented with each segmented bow 30 including a pair of fixed segments 104 and 106 and a removable segment 108 located between the two fixed segments 104 and 106. Each fixed segment 104 is attached to the longitudinal side rail 22 along the side wall 6 of the body B and extends inwardly and slightly upwardly from that side rail 22 to the center stringer 34. The segment 104 terminates slightly beyond the center stringer 34, but is continuous between its ends. The other fixed segment 106 is quite short, it being attached to the side rail 22 along the other side wall 4 and terminating a short distance beyond the first or lowermost lateral stringer 36. The center stringer 34 and the two lateral stringers 36 to the right of it are welded to the fixed segments 104, whereas to the left of the center stringer 34, only the lowermost lateral stringer 36 is welded to the other fixed segment 106 on each segmented bow 30. Each of the fixed segments 106 at its upper end is provided with longitudinally extending tongue 110 (FIG. 11) which is small enough to fit into the rectangular tubing from which the segmented bows 30 are formed.

Figure 10:
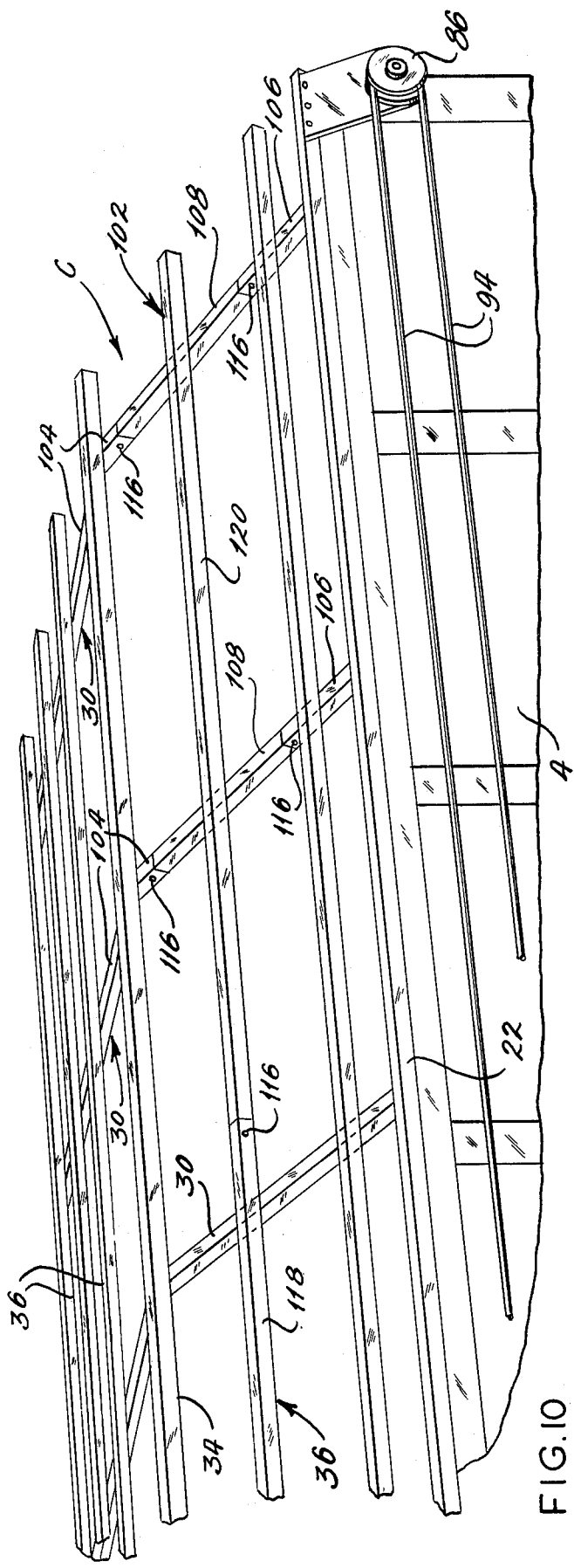
FIG. 10 is a fragmentary perspective view of a modified frame having a removable section therein.
Figure 11:
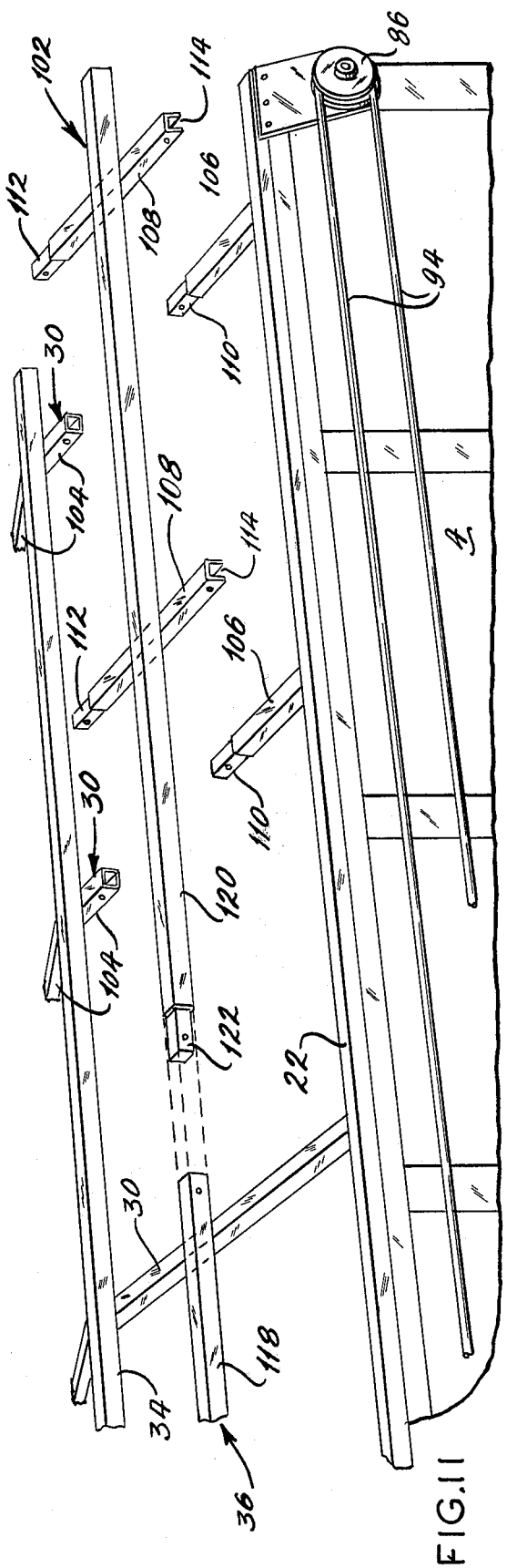
FIG. 11 is a perspective view of the frame of FIG. 10, but showing the removable section detached from the remainder of the frame.

The removable segments 108 fit between the ends of the fixed segments 104 and 106 so as to form a continous bow 30 when in place. Each removable segment 108 at its upper end is provided with a longitudinal tongue 112 (FIG. 11) which fits into the hollow end of its corresponding fixed segment 106 immediately to the left of the center stringer 34. The lower end of the removable segment 108 receives the tongue 110 projecting from the corresponding fixed segment 106. The lower wall of the removable segment 108 is cut away at the tongue 110 so as to provide a cutout 114 which enables the lower end of the removable segment 108 to be merely dropped in place, once the tongue 112 at the upper end is fitted into the end of the long fixed segment 104. The removable segment 108 is retained in place by pins 116 which extend transversely through the tongues 110 and 112 (FIG. 10).

In addition to the two rearmost bows 30 being segmented, the lateral stringer 36 located immediately to the left of the center stringer 34 is also segmented so as to have a fixed portion 118 and a removable portion 120 which longitudinally align. The removable portion 120 extends over and is welded to the two removable segments 108 of the segmented bows 30. At its forward end the removable portion 120 is provided with a tongue 122 (FIG. 11) which fits into the hollow end of the fixed portion 118, and the two portions 118 and 120 are normally held together with another pin 116 (FIG. 10).

The removable segments 108 of the last two bows 30 and the removable portion 120 of the lateral stringer 36 which extends over and is attached to those removable segments 108 constitute the removable frame section 102 which is easily detached from the remainder of the frame 20 merely by pulling the five pins 116 and then lifting the frame section 124 upwardly at its lower ends while pulling it away from the ends of the fixed segment 104 for the segmented bows 30 and the fixed portion 118 for the segmented lateral stringer 36.

The gap left in the frame 120 as a result of the removal of the frame section 102 easily accommodates a chain from which the header of a combine is suspended. In this regard, the chain may be attached to the hydraulically operated boom on the combine. The header is inserted into the truck body B from the rear end which is opened, and as it moves forwardly it passes beneath the fixed segments 104 and 106 of the segmented bows 30. The upper end of the combine lifting boom, on the other hand, is above the frame 20. The suspending chain merely moves through the gaps left in the segmented bows 30 by the removal of the frame section 102. When the header is at the desired location, it is lowered to the bed 2, the chain is detached and removed, and the frame section 102 replaced. Thereafter the tarpaulin 40 may be moved over the frame 20 to protect the combine header.

Figure 12:
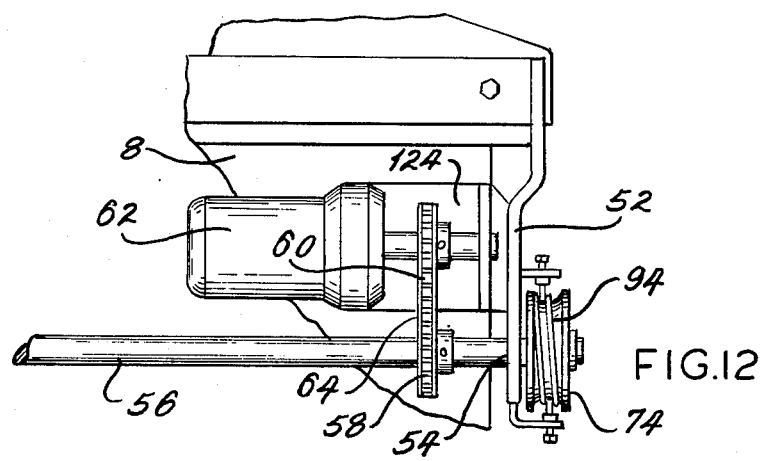
FIG. 12 is an elevational view of a modified mounting for the motor used to move the cover.

Instead of bolting the motor unit 62 directly to the front wall 8 of the body below the sprocket 58 on the shaft 56, it may be carried by the bearing plate 52 at which the sprocket 58 is located (FIG. 12). In particular, the plate 52 has bracket 124 welded to it in a vertical disposition generally above the shaft 56 and its bearing 54. The motor unit 62 is bolted to the bracket 124 with its drive sprocket 60 aligned with the sprocket 58. The chain 64 extends around the two aligned sprockets 58 and 60. The bracket 124 eliminates the need for drilling mounting holes in the truck body B, which holes may permit grain to escape. It further provides a highly compact configuration which is installed entirely as a unit. In other words, the frame 20 is merely bolted in place, there being no separate installation procedure for the motor unit 62.

The crank 72, including its sprocket 60 and bearing 68, may be attached to the bearing plate 52 in a similar manner and used either as a back up for the motor unit 62 or in lieu of the motor unit 62.

This invention is intended to cover all changes and modifications of the example of the invention herein chosen for purposes of the disclosure which do not constitute departures from the spirit and scope of the invention.

What is claimed is:

1. In combination with an open top truck body having upstanding spaced apart sidewalls, a cover assembly for covering the open top of the truck body, said cover assembly comprising: a frame fastened to the truck body and bridging the open top thereof; aligned front and rear sheaves located adjacent each sidewall for rotation about spaced apart axes which are fixed in position with respect to the frame; endless cables extended around the front and rear sheaves and having upper and lower passes which extend along the sidewalls of the truck body; means for rotating the sheaves to drive the cables in unison and in both directions; a flexible cover extending over and supported on the frame, the cover having ends and sides with one of the ends being fixed in position with respect to the frame and the other end being attached to the two cables such that said other end will move with one of the cable passes, the sides of the cover being connected to the upper passes of the endless cables such that the cables can move relative to the sides of the cover but the sides of the cover cannot be pulled away from the upper passes, whereby when the cables move in one direction the cover will move to a folded position wherein it gathers together adjacent to its fixed end and when the cables move in the opposite direction the cover spreads out over the frame and covers the open top of the truck body; and connecting means interconnecting the upper and lower passes of each cable for preventing the upper passes from spreading away from their lower passes as a result of forces exerted by the cover, the connecting means being slidable with respect to the upper and lower passes.

2. The combination according to claim 1 wherein the cover has a plurality of tabs along each of its sides and is connected to the upper passes of the cables at the tabs; and wherein the connecting means are connectors which extend between the upper and lower passes, the connectors being interposed between the tabs.

3. The combination according to claim 2 wherein the connectors have hooks at their ends and the hooks pass around the upper and lower passes of the cables.

4. The combination according to claim 2 wherein the connectors are chains and the upper and lower passes of the cables pass between links of the chains.

5. The combination according to claim 2 and further comprising mounts on which the sheaves rotate, the mounts being attached directly to the frame so that the frame and sheaves may be installed as a unit on the truck body.

6. In combination with an open top truck body having upstanding spaced apart sidewalls, a cover assembly for covering the open top of the truck body, said cover assembly comprising: a frame fastened to the truck body and bridging the open top thereof; aligned first and second sheaves located adjacent each sidewall for rotation about spaced apart axes which are fixed in position with respect to the frame; endless cables extended around the first and second sheaves and having upper and lower passes which are adjacent to the sidewalls of the truck body, the cables being passed around the first sheaves at least one and a half times so that at least two convolutions of cable exist along a portion of each first sheave; drive means for rotating the first sheaves in unison to drive the cables in unison and in both directions; separating means located in a fixed position with respect to the frame and being detached from the first sheaves so that the sheaves rotate relative to the separating means, the separating means projecting between the convolutions of cable on the first sheaves to prevent the convolutions from crossing; and a flexible cover extending over and supported on the frame, the cover having ends and sides with one of the ends being fixed in position with respect to the frame and the other end being attached to one of the passes for each of the two cables such that said other end will move with those passes, the sides of the cover being connected to the endless cables such that the cables can move relative to the sides of the cover, but the sides of the cover cannot be pulled away from the cables, whereby when the cables move in one direction, the cover will move to a folded position wherein it gathers together adjacent to its fixed end, and when the cables move in the opposite direction, the cover spreads out over the frame and covers the open top of the truck body.

7. The combination of claim 6 wherein the separating means project between the convolutions on each sheave at the two locations where the upper and lower cable passes leave the sheaves.

8. The combination according to claim 7 wherein the separating means includes bolts which thread down toward the axes of the first sheaves and have their ends between the convolutions of the cables.

9. The combination according to claim 6 wherein the first sheaves rotate on mounting plates located at the side walls of the truck body, and the passes of the cable extend generally horizontally between the first and second sheaves; and wherein the separating means comprises first elements projected outwardly from the mounting plates and positioned generally above and below the axis of rotation for the first sheaves, and second elements extended inwardly from the first elements and toward the axis of rotation for the first sheaves, the second element being interposed between the convolutions of the cables where those cables pass onto and pay off of the first sheaves.

10. The combination according to claim 9 wherein the second elements thread into the first elements so that they can be adjusted toward and away from the first sheaves.

11. The combination according to claim 6 wherein the first sheaves are mounted on a common shaft and the shaft rotates in plates which are attached to the frame and are located adjacent to the side walls of the truck body, and wherein the drive means for rotating the first sheaves is mounted on one of the plates.

12. The combination according to claim 11 wherein the drive means is an electric motor which is mounted on said one plate above the common shaft on which the sheaves are mounted.

13. In combination with an open top truck body having upstanding spaced apart sidewalls, a cover assembly for covering the open top of the truck body, said cover assembly comprising: a frame fastened to the truck body and bridging the open top thereof, the frame including rigid bows extending transversely of the truck body between the sides thereof and rigid stringers extending longitudinally of the body between the sides thereof, the stringers being extended over and attached to the bows such that the stringers are elevated above the bows at the locations where they cross the bows, at least one of the stringers being segmented into a portion fixed with respect to the frame and a removable portion which is detachable from the fixed portion, at least one of the bows being segmented into at least one portion fixed with respect to the frame and a removable portion which is detachable from the fixed portion of the bow, the removable portion of said one stringer being attached to the removable portion of said bow so as to form a removable frame section which may be detached and removed from the remainder of the frame as a unit, whereby the truck body at the location of the removable frame section is not fully traversed by a bow when the frame section is removed; aligned front and rear sheaves located adjacent each sidewall for rotation about spaced apart axes which are fixed in position with respect to the frame; endless cables extended around the front and rear sheaves and having upper and lower passes which extend along the sidewalls of the truck body; means for rotating the sheaves to drive the cables in unison and in both directions; and a flexible cover extending over and supported on the frame, the cover having ends and sides with one of the ends being fixed in position with respect to the frame and the other end being attached to the two cables such that said other end will move with one of the cable passes on each of the two cables, the sides of the cover being connected to the endless cables such that the cables can move relative to the sides of the cover but the sides of the cover cannot be pulled away from the cables, whereby when the cables move in one direction the cover will move to a folded position wherein it gathers together adjacent to its fixed end and when the cables move in the opposite direction the cover spreads out over the frame and covers the open top of the truck body.

14. The combination according to claim 13 wherein the segmented bows are the bows located farthest from the location at which the flexible cover is attached to the frame.

15. The combination according to claim 13 wherein the cover is attached to the front end of the frame and the removable frame section is at the rear end of the frame.

* * * * *